Nov. 1, 1955 H. H. KERSTEN 2,722,266
REFRIGERATED SEAT AND/OR BACK REST
Filed April 3, 1953 2 Sheets-Sheet 1
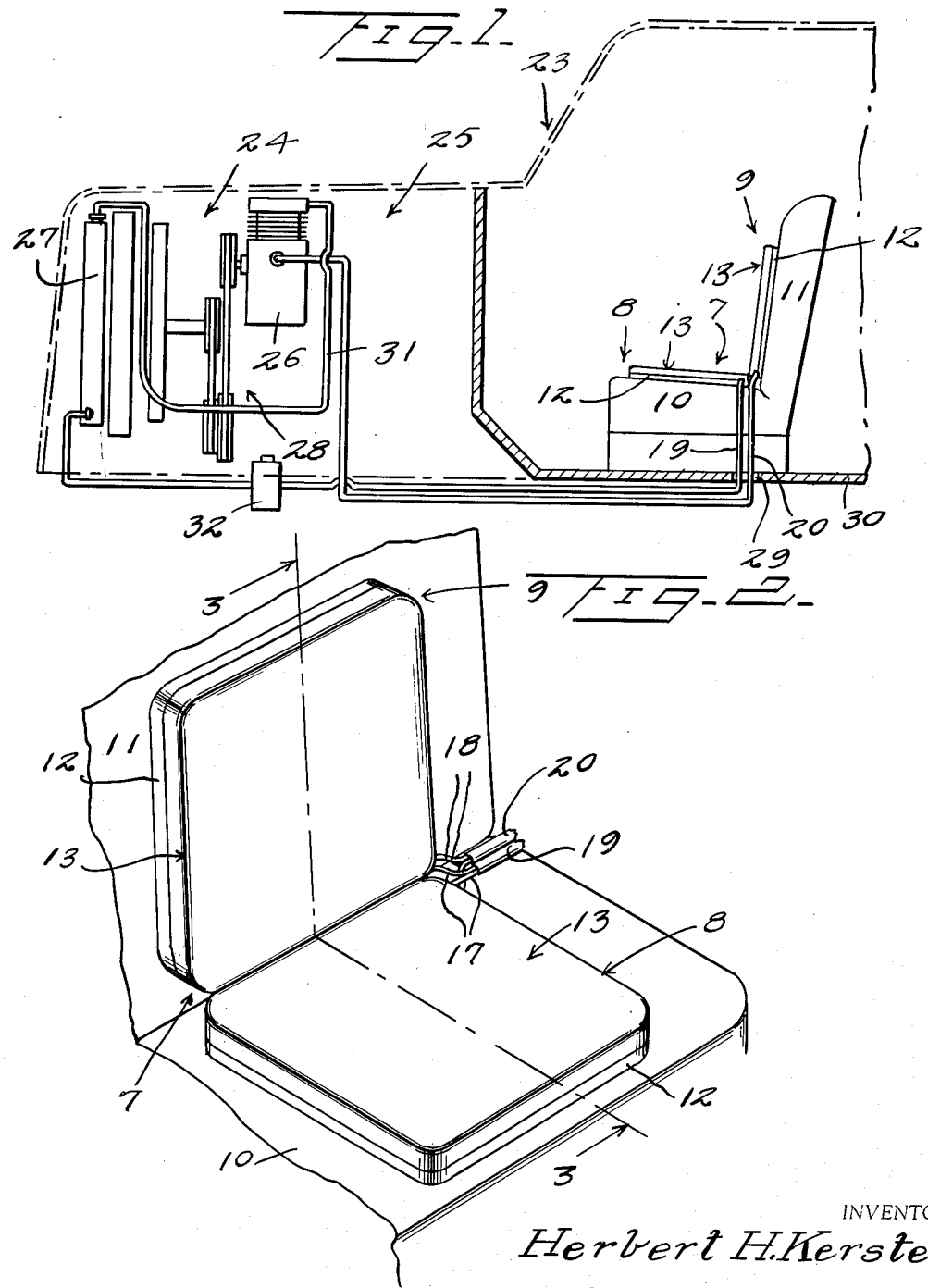
INVENTOR
*Herbert H. Kersten*
BY *John N. Randolph*
ATTORNEY

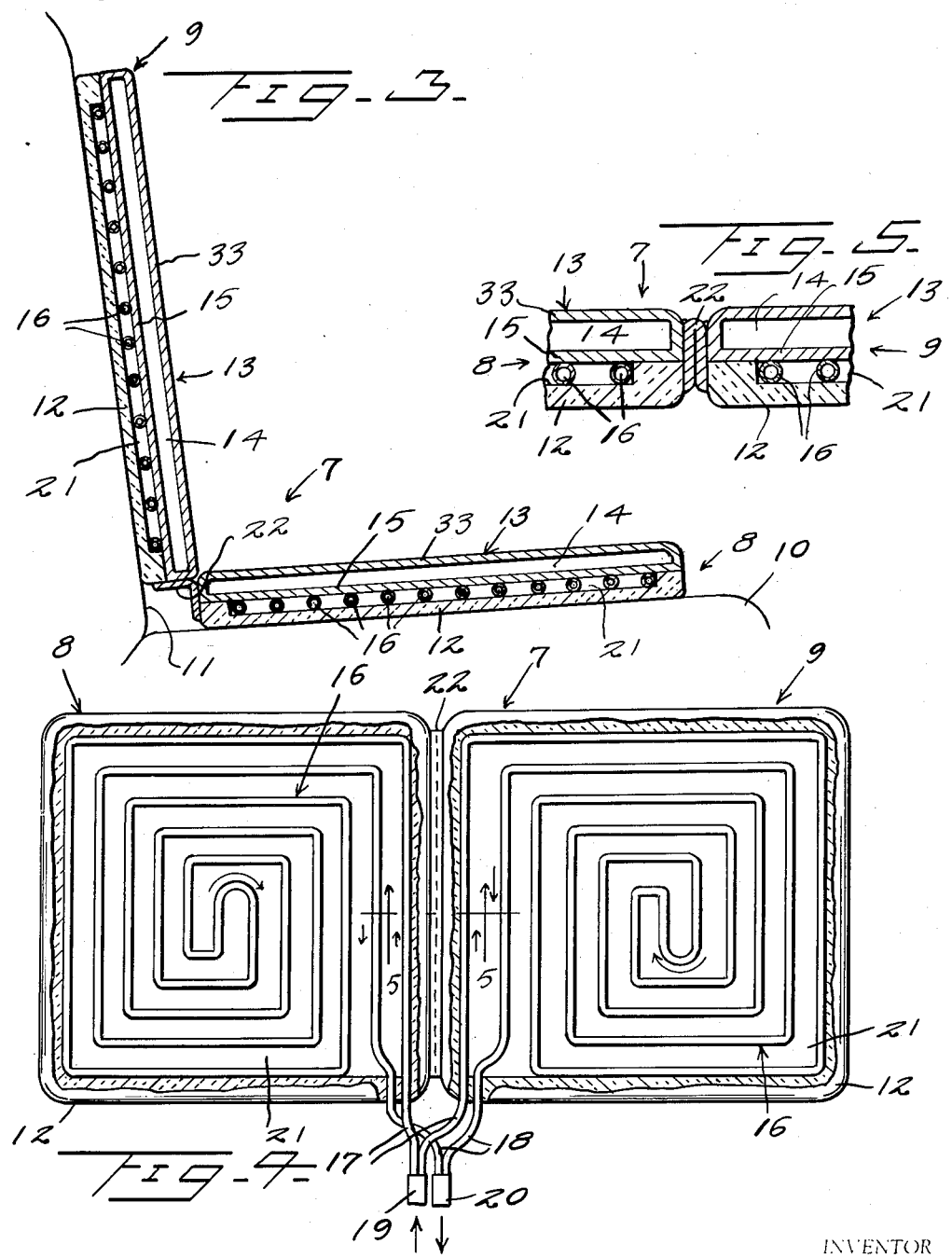

2,722,266

REFRIGERATED SEAT AND/OR BACK REST

Herbert H. Kersten, Fort Dodge, Iowa

Application April 3, 1953, Serial No. 346,696

5 Claims. (Cl. 155—1)

This invention relates to a novel refrigerated seat and/or back rest of general utility but primarily adapted for motor vehicles.

More particularly, it is an aim of the present invention to provide a seat and/or back rest containing an evaporator or cooling means connected to a refrigerating system whereby a refrigerant is supplied to the seat and/or back rest for cooling an area thereof in contact with the body of the user whereby the body temperature of the user can be effectively cooled even though other portions of the body are exposed to higher temperatures and whereby a unit is provided which will function much more effectively as a cooling means for the human body under high temperature conditions than where an attempt is made to effect cooling of an entire enclosure.

Another and particularly important object of the present invention is to provide a seat and/or back rest structure whereby the possibility of condensation is minimized without adversely affecting the cooling efficiency of the seat and/or back rest, when in use.

Various other objects and advantages of the invention will hereinafter become more fully apparent from the following description of the drawings, illustrating one presently preferred embodiment thereof, and wherein:

Figure 1 is a side elevational view showing the cooling unit associated with a motor vehicle;

Figure 2 is an enlarged perspective view of a portion of the unit;

Figure 3 is an enlarged sectional view taken substantially along a plane as indicated by the line 3—3 of Figure 2;

Figure 4 is an enlarged extended horizontal sectional view, partly in elevation, of the refrigerated seat and back rest, and Figure 5 is an enlarged longitudinal sectional view of a portion thereof taken substantially along a plane as indicated by the line 5—5 of Figure 4.

Referring more specifically to the drawings, the refrigerated seat and/or back rest comprising the invention is designated generally 7 and in the form thereof as illustrated in the drawings, comprises a seat cushion, designated generally 8, and a back rest cushion, designated generally 9. In the drawings, the seat cushion 8 is illustrated as being disposed on a vehicle seat 10 and the cushion 9 is shown disposed against a back rest 11 of the vehicle seat 10. However, as the description proceeds it will become apparent that the structures comprising the cushions 8 and 9 could be built into the seat 10 and back rest 11 or could be embodied as an integral part of any other seat or back rest. It will also become apparent that either of the parts 8 or 9 could be utilized separately and while illustrated as of a size to accommodate a single person, could be made of any desired width to accommodate two or more persons, as for example of widths corresponding to the normal widths of motor vehicle seats and back rests. The cushions 8 and 9 are of identical construction, each including a bottom section 12 formed of any suitable heat and cold insulating material, and a hollow top section 13. The top or outer section 13 constitutes a casing defining a chamber 14 containing compressed air and which casing is formed of a material impervious to air such as rubber. The marginal portion of the bottom ply or layer 15 of the casing 13 is suitably secured or bonded to the marginal portion of an upper or inner surface of the insulating section 12. Said insulating section 12 is provided with a recess 21 in the inner surface thereof which is surrounded by said marginal portion and which recess accommodates an evaporator or cooling coil 16 having end portions 17 and 18 extending outwardly from the cushion through a part of said marginal portion of the insulating section 12, as best illustrated in Figure 4. The ends 17 of the cooling coils 16 of the cushions 8 and 9 form branch conduits which connect to and lead from the discharge end of an insulated refrigerant supply conduit 19 and the other two ends 18 of the coils 16 connect with the inlet end of an insulated return conduit 20. Adjacent ends or edges of the cushions 8 and 9 are connected by a flexible strip 22 which is suitably bonded to each of said edges to form a hinge.

Any suitable refrigerant compressing and condensing system may be employed for supplying a fluid refrigerant to the cooling coils 16. For example, assuming that the cushions 8 and 9 are being employed for cooling an operator or passenger of a motor vehicle 23, of which the seat 10 and back rest 11 form parts, a refrigerant compressing and condensing system 24 of a conventional type may be disposed beneath the hood or within the engine compartment 25 of the vehicle 23. As illustrated, the refrigerant compressing and condensing system 24 includes a compressor 26 and a condenser 27. The compressor 26 is operated by a belt and pulley drive 28 from either the drive shaft, generator or cooling fan shaft of the motor vehicle 23. The return conduit 20 leads from the cushions 8 and 9 to the compressor 26 and as illustrated in Figure 1, preferably extends downwardly along an end or side edge of the seat 10 through an opening 29 in the floor board 30 of the vehicle 23. A conduit 31, of a construction corresponding to the conduits 19 and 20, leads from the compressor 26 to the condenser 27. The other end of the supply conduit 19 is connected to the condenser 27 and likewise extends through the opening 29 and along the same side edge or end of the seat 10 as the conduit 20. A fluid receiver 32 is interposed in the conduit 19. A fluid refrigerant is supplied from the condenser 27 through the receiver 32 by way of the supply conduit 19 to the cooling coils 16 through their inlet ends 17. The fluid refrigerant is vaporized in the cooling coils 16 and is then returned through the outlet ends 18 and return conduit 20 to the compressor 26, in a conventional manner.

It will be apparent that the insulated bottom section of each of the cushions 8 and 9 will minimize the amount of heat reaching the cooling coil 16 therethrough or the escape of cold therethrough from the cooling coil, The air in the chamber 14 above or on the outer side of the cooling coil 16 of each cushion will act as an effective insulator to the outer body engaging ply or layer 33 of the casing 13 of said cushion to prevent chilling of said outer ply or layer, while the casing 13 is in a normal condition as illustrated in Figure 3, to thus prevent the escape of cold therefrom and the formation of condensation thereon. However, the compressed air within the chamber 14 is at a sufficiently low pressure so that the casing 13 is compressed by the user sitting thereon or leaning thereagainst, and portions of the outer ply 33 of said casing actually in contact with the body of the user will be displaced into engagement with the inner ply 15 by the compressing of the air in the chamber 14 into other areas thereof, so that the cooling action of the coil 16 may be effectively transmitted through the contacting or abutting ply portions 15 and 33 to the body of the user seated upon or leaning against said casing 13. Thus, the cooling coil 16 of each cushion will be insulated to prevent the escape of cold from the chamber 14 except when the cushion is in use. This will obviously be true with both the seat cushion and back rest cushion and whether the cushions are separate, as illustrated, or formed as an integral part of a seat and back rest.

While the invention has been described in connection with a motor vehicle, it will be readily apparent that the cushion could be used in connection with other seats and back rests and with a refrigerant compressing and condensing system or as an integral part of such other seat or back rest.

Various other modifications and changes are contemplated and may obviously be resorted to, without departing from the spirit or scope of the invention as hereinafter defined by the appended claims.

I claim as my invention:

1. A seat or back rest comprising an inner section formed of a heat insulating material, an outer section comprising an inflated casing including an inner ply and an outer ply, said plies being normally held spaced from one another by compressed air within said casing, a marginal portion of said inner ply being secured to a marginal portion of an inner side of said inner section, said inner side of said inner section having a recess surrounded by said marginal portion thereof, and a cooling coil disposed within said recess through which a refrigerating medium is circulated.

2. A seat or back rest as in claim 1, portions of the outer ply of said casing being displaceable into engagement with portions of the inner ply thereof by the pressure of a portion of the body of the user, and said inner ply being in engagement with the cooling coil whereby cold is transmitted through said ply portions from the cooling coil.

3. A seat or back rest comprising an inner section and an outer section, a cooling coil interposed between said sections, said outer section comprising an inflated casing including inner and outer plies normally disposed in spaced apart relationship, portions of said outer ply being displaceable into engagement with portions of the inner ply by a pressure exerted against the outer side thereof for transmitting cold from the cooling coil through said contacting ply portions.

4. A seat or back rest as in claim 3, said inner section being formed of a heat insulating material and having a recess in the inner side thereof defining a chamber containing said cooling coil.

5. A seat or back rest comprising an inner section and an outer section, a refrigerating means interposed between said sections, said outer section comprising an inflated casing containing compressed air and including an inner ply and an outer ply, said plies being normally held in spaced apart relationship to one another by the compressed air within said casing, and portions of said outer ply being displaceable into engagement with portions of the inner ply in response to a pressure against the outer side of the outer ply whereby cold is transmitted outwardly through said contacting ply portions from said refrigerating means.

References Cited in the file of this patent

UNITED STATES PATENTS

| | | |
|---|---|---|
| 800,967 | Young et al. | Oct. 3, 1905 |
| 1,991,784 | Bohemier et al. | Feb. 19, 1935 |
| 2,004,106 | Gaston | June 11, 1935 |
| 2,260,134 | Ballman | Oct. 21, 1941 |
| 2,544,506 | Kronhaus | Mar. 6, 1951 |
| 2,562,121 | Poux | July 24, 1951 |